(12) United States Patent
Wise

(10) Patent No.: US 11,950,679 B1
(45) Date of Patent: Apr. 9, 2024

(54) COUPLING SEAL OF A CONTAINER

(71) Applicant: Robert Wise, Penngrove, CA (US)

(72) Inventor: Robert Wise, Penngrove, CA (US)

( * ) Notice: Subject to any disclaimer, the term of this patent is extended or adjusted under 35 U.S.C. 154(b) by 0 days.

(21) Appl. No.: 18/153,629

(22) Filed: Jan. 12, 2023

Related U.S. Application Data

(63) Continuation-in-part of application No. 17/837,890, filed on Jun. 10, 2022, and a continuation-in-part of application No. 17/837,491, filed on Jun. 10, 2022, and a continuation-in-part of application No. 17/506,942, filed on Oct. 21, 2021, which is a continuation of application No. 17/018,826, filed on Sep. 11, 2020, said application No. 17/837,491 is a continuation of application No. 16/875,100, filed on May 15, 2020, now abandoned, said application No. 17/018,826 is a continuation of application No. 16/875,100, filed on May 15, 2020, now abandoned, said application No. 17/837,890 is a continuation-in-part of application No. 16/875,100, filed on May 15, 2020, now abandoned, which is a continuation-in-part of application No. 16/856,362, filed on Apr. 23, 2020, now Pat. No. 11,304,495, which is a continuation-in-part of application No. 16/855,361, filed on Apr. 22, 2020, now Pat. No. 11,317,698, which is a continuation-in-part of application No. 16/683,689, filed on Nov. 14, 2019, now Pat. No. 11,304,494.

(51) Int. Cl.
| | |
|---|---|
| *A45D 34/04* | (2006.01) |
| *A45D 40/04* | (2006.01) |
| *A45D 34/00* | (2006.01) |
| *A45D 40/00* | (2006.01) |

(52) U.S. Cl.
CPC .......... *A45D 34/041* (2013.01); *A45D 40/04* (2013.01); *A45D 2034/005* (2013.01); *A45D 2040/0043* (2013.01); *A45D 2040/005* (2013.01)

(58) Field of Classification Search
CPC ...... A45D 34/04; A45D 34/041; A45D 40/04; A45D 2034/002; A45D 2040/222; A45D 2040/223
See application file for complete search history.

(56) References Cited

U.S. PATENT DOCUMENTS

| | | |
|---|---|---|
| 1,863,106 A | 6/1932 | Alexandre |
| 1,904,364 A | 4/1933 | Fullmer |
| 2,471,852 A | 5/1949 | Gordon |
| 2,632,193 A | 3/1953 | Gilchrist |
| (Continued) | | |

*Primary Examiner* — Jennifer C Chiang
(74) *Attorney, Agent, or Firm* — Boudwin Intellectual Property Law, LLC; Daniel Boudwin

(57) ABSTRACT

A coupling seal of a container is provided. The coupling seal of a container includes a container with an interior reservoir. The interior reservoir is accessible via a rim about an aperture. The rim includes a number of protrusions. The protrusions are placed about the circumference of the rim so that a containment apparatus can mate with the rim. The containment apparatus includes a surface with a peripheral flange protruding therefrom. A number of arises are provided on the peripheral flange and are designed to mate with the protrusions of the rim. Rotation of the containment apparatus upon the rim causes the arises of the containment apparatus to mate with the protrusions of the rim, causing the container to seal.

19 Claims, 8 Drawing Sheets

(56) References Cited

U.S. PATENT DOCUMENTS

| | | |
|---|---|---|
| 3,111,703 A | 11/1963 | George |
| 3,212,120 A | 10/1965 | Gentile |
| 3,913,595 A | 10/1975 | Grisel |
| 4,140,411 A | 2/1979 | Harbauer et al. |
| 4,277,194 A | 7/1981 | Smith |
| 4,343,460 A | 8/1982 | Gende |
| 4,359,292 A | 11/1982 | Thompson et al. |
| 4,388,011 A | 6/1983 | Smith |
| 4,605,330 A | 8/1986 | Crowley et al. |
| 4,702,398 A | 10/1987 | Seager |
| 4,932,802 A | 6/1990 | Cantone |
| 5,255,990 A | 10/1993 | Dornbusch et al. |
| 5,505,041 A | 4/1996 | Harlan |
| 5,547,302 A | 8/1996 | Dornbusch et al. |
| 5,829,976 A | 11/1998 | Green |
| 5,833,382 A | 11/1998 | Jenks et al. |
| 5,947,621 A | 9/1999 | Szekely |
| 6,269,982 B1 | 8/2001 | Kreiseder et al. |
| 7,708,169 B1 | 5/2010 | Szoke, Jr. |
| 8,388,252 B2 * | 3/2013 | Thiebaut ............... A45D 34/04 401/209 |
| 8,919,617 B2 | 12/2014 | Foley |
| 9,872,551 B2 | 1/2018 | Swaile et al. |
| 10,743,636 B2 | 8/2020 | Bushell |
| 11,033,091 B2 | 6/2021 | Wiesenthal et al. |
| 11,109,658 B1 | 9/2021 | Khodzhayan |
| 11,490,708 B2 | 11/2022 | Groffsky et al. |
| 11,517,098 B2 | 12/2022 | Nolan et al. |
| 2004/0005186 A1 | 1/2004 | Jeda et al. |
| 2004/0120756 A1 | 6/2004 | Cheng |
| 2006/0018704 A1 | 1/2006 | Baines et al. |
| 2006/0029455 A1 | 2/2006 | Baines et al. |
| 2006/0065673 A1 | 3/2006 | Miyazaki et al. |
| 2006/0076370 A1 | 4/2006 | Etesse |
| 2006/0222445 A1 | 10/2006 | Chuang |
| 2007/0014625 A1 | 1/2007 | Delage |
| 2008/0050168 A1 | 2/2008 | Groh et al. |
| 2008/0107475 A1 | 5/2008 | Wojcik et al. |
| 2013/0170886 A1 | 7/2013 | Thulin et al. |
| 2014/0286689 A1 | 9/2014 | Jung |
| 2016/0157580 A1 | 6/2016 | Crawford et al. |
| 2016/0174687 A1 | 6/2016 | Ellsworth |
| 2017/0251785 A1 * | 9/2017 | Le ...................... A45D 34/041 |
| 2018/0086542 A1 | 3/2018 | Ellsworth et al. |
| 2018/0249808 A1 | 9/2018 | Crawford et al. |
| 2018/0249809 A1 | 9/2018 | Crawford et al. |
| 2018/0295968 A1 | 10/2018 | Groffsky et al. |
| 2021/0061533 A1 | 3/2021 | Chen |
| 2021/0137243 A1 | 5/2021 | Nolan et al. |
| 2021/0289918 A1 | 9/2021 | Thulin et al. |
| 2022/0395077 A1 | 12/2022 | Chen |

\* cited by examiner

COUPLING SEAL OF A CONTAINER

CROSS REFERENCE TO RELATED APPLICATIONS

This application claims the benefit of U.S. Provisional Application Ser. No. 17/506,942 filed on Oct. 21, 2021 which is a continuation-in-part of U.S. patent application Ser. No. 16/856,362, filed on Apr. 23, 2020, which is a continuation-in-part of U.S. patent application Ser. No. 16/855,361 filed on Apr. 22, 2020, which is a continuation-in-part of U.S. patent application Ser. No. 16/683,689 filed on Nov. 14, 2019. The above identified patent application is herein incorporated by reference in its entirety to provide continuity of disclosure.

BACKGROUND OF THE INVENTION

The present invention relates to a coupling mechanism for a container. More specifically, the present invention provides a solution to the problem of container contamination, while providing a controlled mechanism for the release of materials from the container.

Containers often include threading. This threading is designed to allow for users to secure one part of a container to another. Specifically, a lid may be secured to a container by rotating the lid upon the container, causing threading on the lid to interlock with threading on the container. Although this type of threading is common, there are several disadvantages associated with it.

For example, when a cap is placed onto a container with mating threads, there is a constant chance of cross threading the threads of the cap with the threads of the container when reaffixing the cap onto the container. Rotationally twisting the cap off the container requires multiple turns, most often counterclockwise, but not limited to, multiple rotations until the cap is free of the threads of the mating container, then able to be removed off the container.

Generally, a material is removed from the container, for example, a matter is removed from within the container, such as a pill, powder-granular, mayonnaise, water, soda, catsup, etc. type substance, the lid is then recoupled onto the threaded container neck and the lid is rotated clockwise onto the container sealing the opening of the container between uses.

Conventional containers have multiple rows of threads, requiring multiple turns of the cap to either remove the cap or re-thread the cap to seal the opening. For users with an injury, or a type of arthritis or any affliction, each turn is potentially difficult, and painful, users who open, remove caps from containers each day, multiple times a day, who often have more than one prescription or use supplements or the like, a lot of wasted time is spent unthreading these caps, then threading them back onto the containers, and hope the cap goes back on without cross threading, which is frustrating, requires backing the cap off counter clockwise, until the threads of the cap and container align so to thread the cap back onto the container.

Therefore, there is a defined need amongst the known prior art systems and methods for sealing containers for a coupling seal for a container that is effective and easy to use while eliminating the risk of cross-threading and the other known disadvantages of threaded sealing systems for containers.

SUMMARY OF THE INVENTION

In view of the foregoing disadvantages inherent in the known types of container sealing devices and methods now present in the prior art, the present invention provides a coupling seal for a container wherein the same can be utilized for providing convenience for the user when sealing a material within a container.

The present system comprises a container with an interior reservoir. The interior reservoir is accessible via a rim about an aperture. The rim comprises a plurality of protrusions about a circumference of the rim, whereby a containment apparatus mates about the rim of the container. The containment apparatus comprises a surface with a peripheral flange protruding therefrom. A plurality of arises are disposed within the peripheral flange, wherein the plurality of arises are configured to mate with the plurality of protrusions about the rim of the container.

Rotation of the containment apparatus relative to the container causes coupling of the containment apparatus to the container. When rotated, the plurality of protrusions about the rim are engaged with the arises within the containment apparatus, causing the container to seal.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
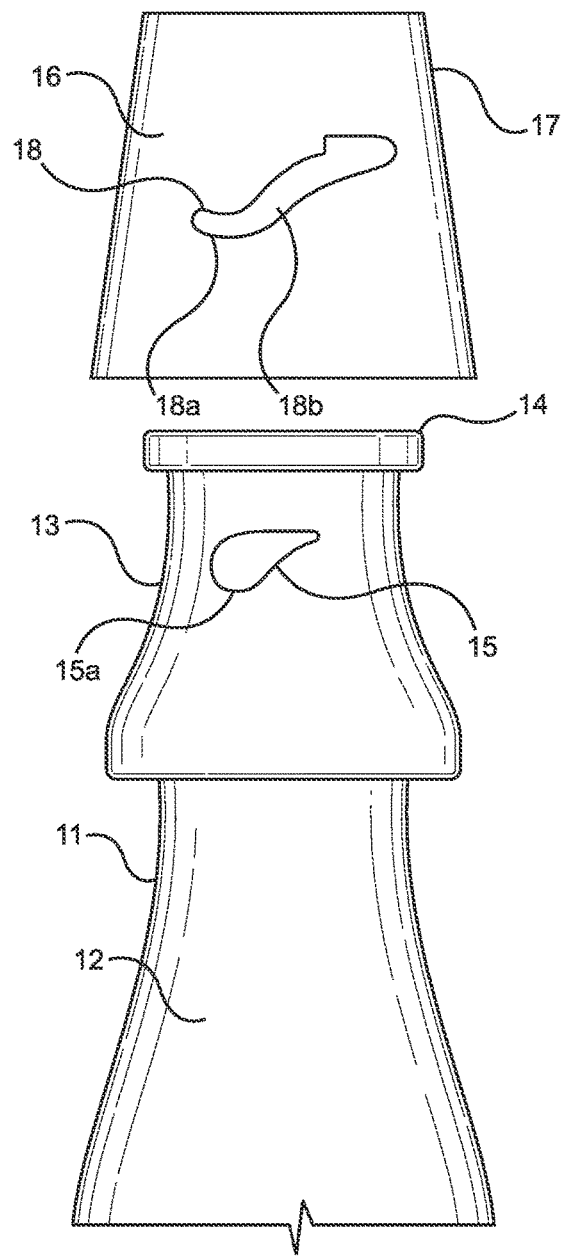
FIG. 1A shows a perspective view of an embodiment of the coupling seal for a container with the containment apparatus disengaged from the container.

Reference is made herein to the attached drawings. Like reference numerals are used throughout the drawings to depict like or similar elements of the coupling seal for a container. The figures are intended for representative purposes only and should not be considered to be limiting in any respect.

Figure 1B:
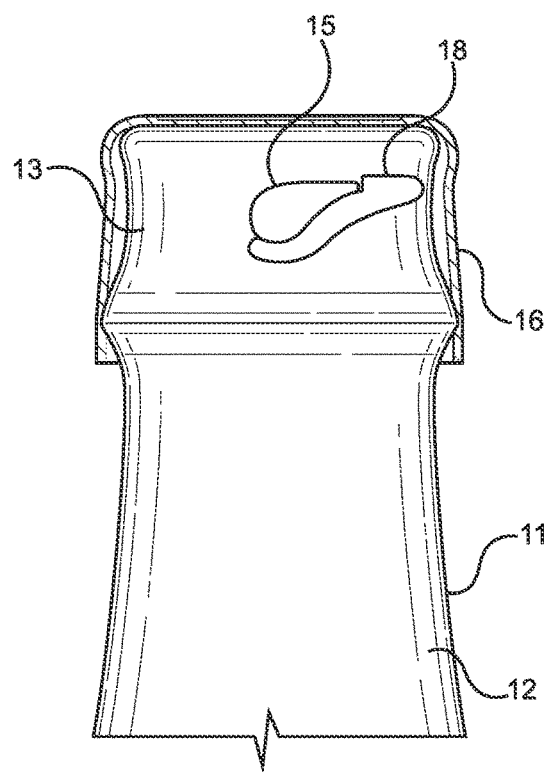
FIG. 1B shows a perspective view of an embodiment of the coupling seal for a container with the containment apparatus engaged with the container.

Referring now to FIGS. 1A and 1B, there are shown perspective views of an embodiment of the coupling seal for a container with the containment apparatus disengaged from the container and engaged with the container, respectively. The coupling seal of a container comprises a container 11. The container defines an interior reservoir 12. The interior reservoir 12 is configured to store a material of any desired substance, state, or consistency. The interior reservoir 12 is accessible through a rim 13 that defines an aperture 14. The rim 13 is circular and is formed around the aperture 14.

The rim 13 comprises a plurality of protrusions 15 thereon. Specifically, the plurality of protrusions 15 is disposed about a circumference of the rim 13. The plurality of protrusions 15 in the illustrated embodiment comprises four evenly spaced protrusions extending outward from the exterior surface of the rim 13. As such, rotation necessary for coupling to the rim 13 is minimized relative to having three for fewer evenly spaced protrusions. The plurality of protrusions 15 are substantially rigid structures which may comprise one or more intrusions or extrusions defined thereby. In the illustrated embodiment, the plurality of protrusions comprises a nodule 15a.

The coupling seal of a container further comprises a containment apparatus 16. The containment apparatus 16 is dimensioned and configured to mate with the rim 13 of the container 11, as shown in FIG. 1B. The containment apparatus 16 is further configured to form a seal with the container 11, such as to prevent contamination or leaking of the materials within the container 11. The containment apparatus 16 comprises a peripheral flange 17 extending downward therefrom. The peripheral flange 17 is configured to engage the rim 13 of the container 11. A plurality of arises 18 are disposed on the peripheral flange 17. The plurality of arises 18 are configured to mate with the plurality of protrusions 15 of the rim 13 of the container 11. The plurality of arises 18 are substantially rigid structures which may comprise one or more intrusions or extrusions defined thereby.

In the illustrated embodiment, the plurality of arises 18 comprise engineered surfaces. As such, when the containment apparatus 16 is rotated on to and off of the rim 13 of the container 11, the plurality of arises 18 will be able to glide along the plurality of protrusions 15 efficiently and free of any stopping mechanisms.

The surfaces of the plurality of arises may include angular surfaces, curved surfaces, slotted surfaces, or any other type of surface suitable for coupling to the plurality of protrusions. In the illustrated embodiment, each arise of the plurality of arises 18 comprises a plurality of additional recesses 18a, 18b. In the illustrated embodiment, the plurality of additional recesses is formed by a downward-oriented arcuate portion 18a distally placed adjacent an upward-oriented arcuate portion 18b. The corresponding protrusion 15 will be smoothly guided along the corresponding arise 18.

Additionally the additional recesses 18a, 18b defined by the plurality of arises 18 allow the containment apparatus 16 to be secured to and sealed to the rim 13 of the container 11, wherein the plurality of additional recesses 18a, 18b allows the containment apparatus to rotate to the second recess 18b and be secured to the rim with less resistance than the first recess 18a, and wherein a plurality of rim apertures about the rim correspond with a second plurality of apertures of the containment apparatus 16, allowing a dispense of the material within the container 11 and eliminating the need for removal of the containment apparatus 16 for each use of the container 11.

In use, rotation of the containment apparatus 16 causes coupling of the containment apparatus 16 to the container 11. The coupling is specifically formed by the engagement of the plurality of protrusions 15 of the rim 13 with the plurality of arises 18 of the containment apparatus 16. When the plurality of protrusions 15 of the rim 13 are engaged with the plurality of arises 18 of the containment apparatus 16, the containment apparatus 16 is secured to the container 11 and a seal is formed. In some embodiments, the containment apparatus 16 comprises a means of sealing the containment apparatus 16 to the rim 13 of the container 11. The means of sealing the containment apparatus 16 could be an O-ring, an applied seal material, a gasket, or any other known sealing structure.

In one embodiment, the plurality of protrusions 15 is configured and formed around the rim of the container such that rotational coupling of the plurality of protrusions 15 to the plurality of arises 18 within a containment apparatus secures a material within the container 11, while also fortifying the rim of a container 11 that is made of a flexible material. As such, the coupling seal may be defined on a container 11 that is made of a flexible material, such as a flexible plastic container.

Figure 1C:
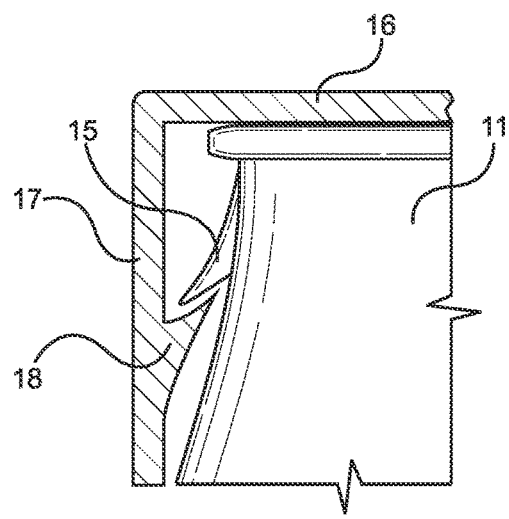
FIG. 1C shows a close-up cross-sectional view of an embodiment of the coupling seal for a container.

Referring now to FIG. 1C, there is shown a close-up cross-sectional view of an embodiment of the coupling seal for a container with the containment apparatus engaged with the container. In the illustrated embodiment, the plurality of protrusions 15 of the container 11 and the plurality of arises 18 of the containment apparatus 16 form a dovetailed interface. The dovetailing of the containment apparatus 16 with the plurality of protrusions 15 of the rim 13 keeps the peripheral flange of the containment apparatus 16 from flexing outward as pressure is applied upon the inside surface of the containment apparatus 16. As such, materials that generate pressure within the container 11, such as carbonated beverages may be stored in the container 11 while a method of pressure release is provided.

Figure 2A:
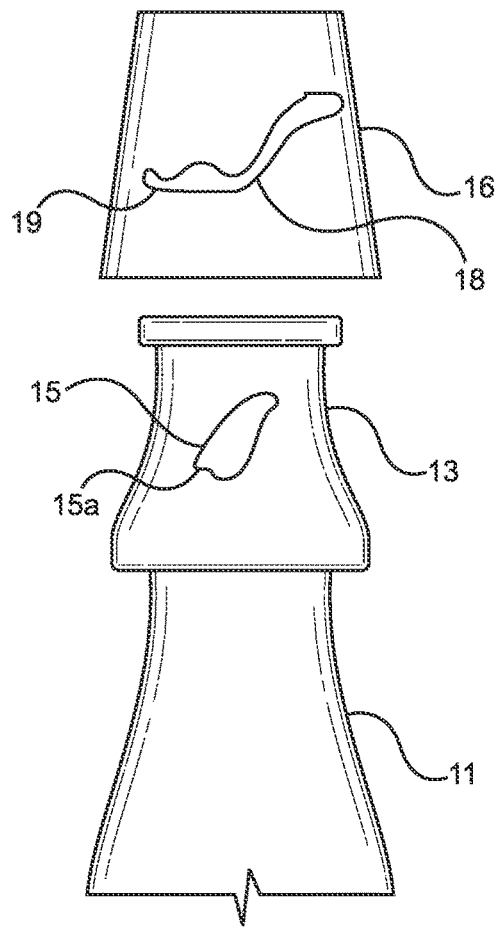
FIG. 2A shows a perspective view of an embodiment of the coupling seal for a container with the containment apparatus disengaged from the container.
Figure 2B:
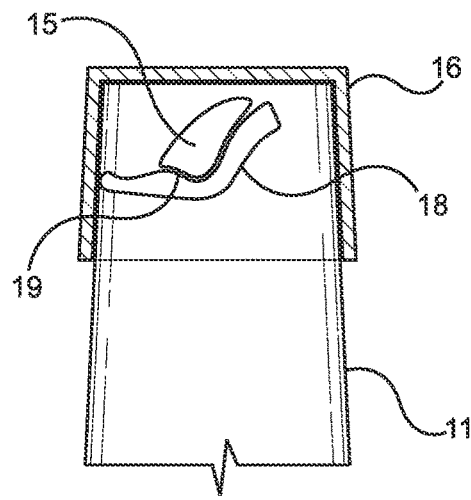
FIG. 2B shows a perspective view of an embodiment of the coupling seal for a container with the containment apparatus engaged with the container.

Referring now to FIGS. 2A and 2B, there are shown perspective views of an embodiment of the coupling seal for a container with the containment apparatus disengaged from the container and engaged with the container, respectively. In the illustrated embodiment, the plurality of protrusions 15 comprises a plurality of nodules 15a. The nodules 15a may comprise one or more mating recesses 19. The mating recesses 19 are configured to engage the plurality of arises 18 of the containment apparatus 16. Rotation of the containment apparatus 16 causes the plurality of arises 18 to engage the mating recesses 19 of the nodules 15a, wherein engagement of the plurality of arises 18 with the mating recesses 19 causes the containment apparatus 16 to be compressed into the rim 13 of the container 11. Alternatively, the nodule 19 may be disposed on the containment apparatus 16, such that the plurality of protrusions 15 will engage the mating recesses 19 of the nodule 15.

Figure 2C:
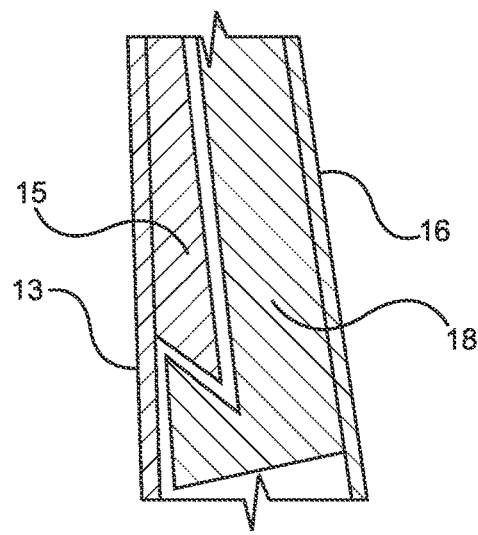
FIG. 2C shows a close-up cross-sectional view of an embodiment of the coupling seal for a container with the containment apparatus engaged with the container.

Referring now to FIG. 2C, there is shown a close-up cross-sectional view of an embodiment of the coupling seal for a container with the containment apparatus engaged with the container. In the illustrated embodiment, the plurality of nodules 15 of the container 11 and the plurality of arises 18 of the containment apparatus 16 form a dovetailed interface. The dovetailing of the containment apparatus 16 with the plurality of nodules 15 of the rim 13 keeps the peripheral flange of the containment apparatus 16 from flexing outward as pressure is applied upon the inside surface of the containment apparatus 16. As such, materials that generate pressure within the container 11, such as carbonated beverages may be stored in the container 11 while a method of pressure release is provided.

Figure 3A:
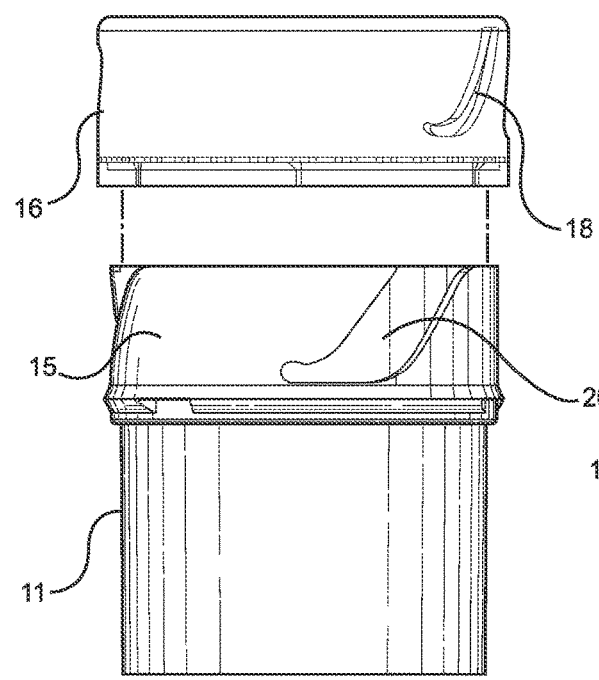
FIG. 3A shows a perspective view of an embodiment of the coupling seal for a container with the containment apparatus disengaged from the container.
Figure 3B:
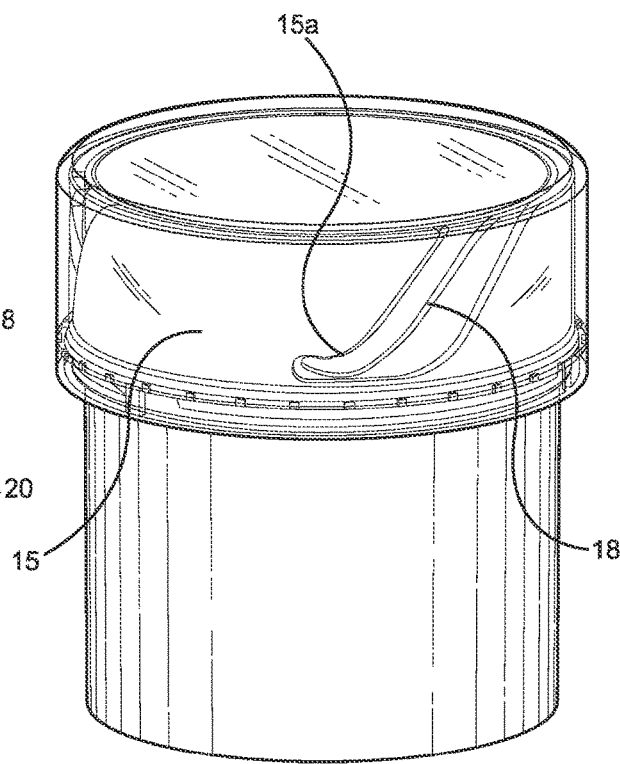
FIG. 3B shows a perspective view of an embodiment of the coupling seal for a container with the containment apparatus engaged with the container.

Referring now to FIGS. 3A and 3B, there are shown perspective views of an embodiment of the coupling seal for a container with the containment apparatus disengaged from the container and engaged with the container, respectively. In the illustrated embodiment, the plurality of protrusions 15 define a plurality of passages 20. Each passage 20 is dimensioned to receive a corresponding arise 18 of the plurality of arises therein. Specifically in the illustrated embodiment, each arise 18 comprises a hook-line portion configured to lock into a nodule 15a defined at the distal end of the passage 20.

Figure 4:
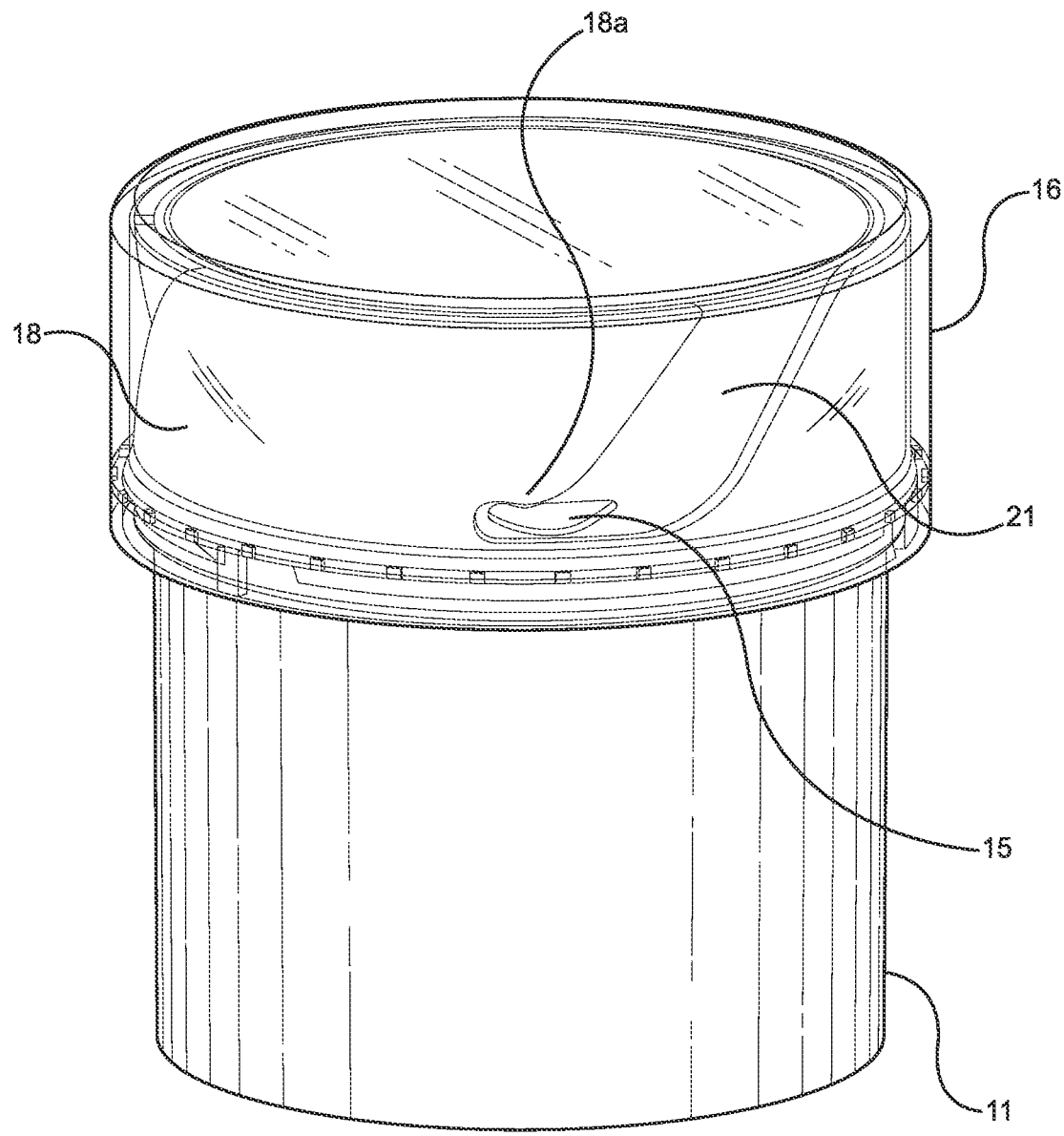
FIG. 4 shows a perspective view of an embodiment of the coupling seal for a container with the containment apparatus engaged with the container.

Referring now to FIG. 4, there is shown a perspective view of an embodiment of the coupling seal for a container with the containment apparatus engaged with the container. In the illustrated embodiment, the plurality of arises 18 define a plurality of passages 21. Each passage 21 is dimensioned to receive a corresponding protrusion 15 of the plurality of protrusions therein. Specifically in the illustrated embodiment, each protrusion 15 comprises a tab configured to engage a nodule 18a defined at the distal end of the passage 21.

Figures 5A, 5B:
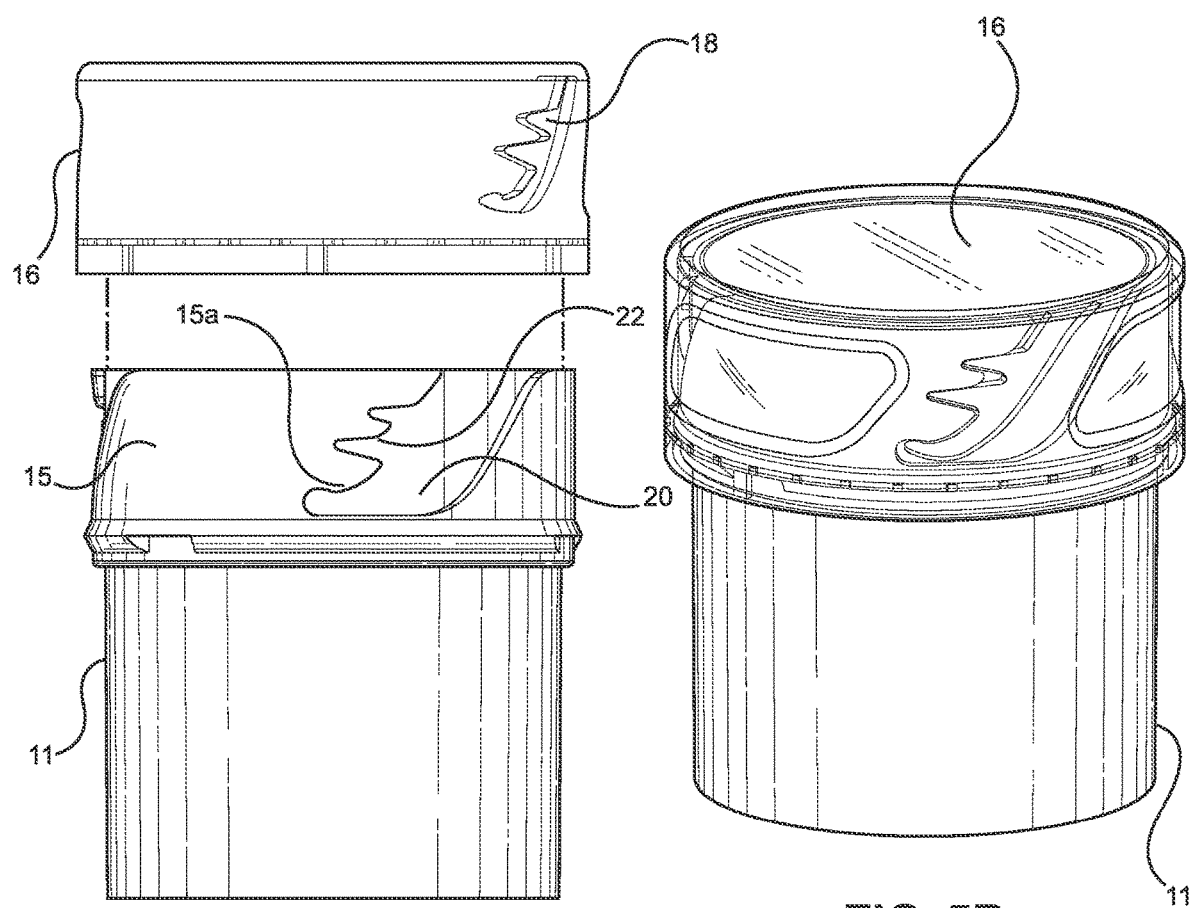
FIG. 5A shows a perspective view of an embodiment of the coupling seal for a container with the containment apparatus disengaged from the container.
FIG. 5B shows a perspective view of an embodiment of the coupling seal for a container with the containment apparatus engaged with the container.

Referring now to FIGS. 5A and 5B, there are shown perspective views of an embodiment of the coupling seal for a container with the containment apparatus disengaged from the container and engaged with the container, respectively. In the illustrated embodiment, the plurality of protrusions 15 define a plurality of passages 20. Each passage 20 is dimensioned to receive a corresponding arise 18 of the plurality of arises therein. Specifically in the illustrated embodiment, each arise 18 comprises a hook-line portion configured to lock into a nodule 15a defined at the distal end of the passage 20. Additionally, in the illustrated embodiment, the plurality of protrusions 15 define a plurality of additional passages 22. The additional passages provide additional support and security of the containment apparatus 16 to the container 11.

Figure 6A:
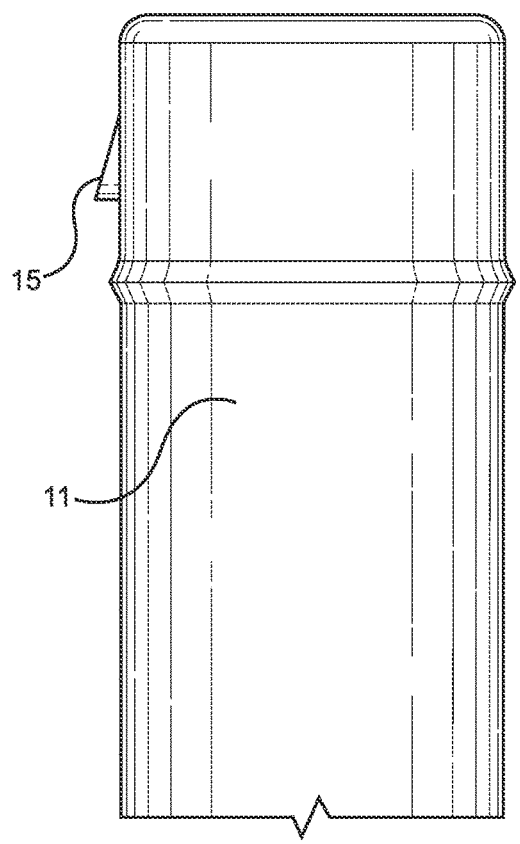
FIG. 6A shows a perspective view of an embodiment of the coupling seal for a container with the containment apparatus disengaged from the container.
Figure 6B:
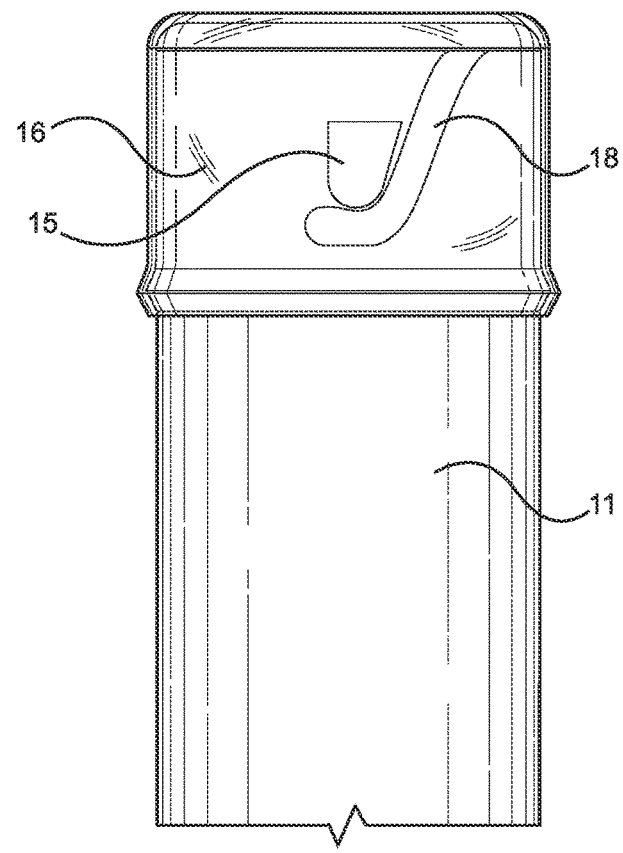
FIG. 6B shows a perspective view of an embodiment of the coupling seal for a container with the containment apparatus engaged with the container.

Referring now to FIGS. 6A and 6B, there are shown perspective views of an embodiment of the coupling seal for a container with the containment apparatus disengaged from the container and engaged with the container, respectively. In the illustrated embodiment, the plurality of protrusions 15 of the container 11 are rotationally secured to the plurality of arises 18 of the containment apparatus 16. As shown, the plurality of arises 18 define a smooth surface into which the protrusions 15 may be rotated. As such, the containment apparatus 16 may be secured to the container 11.

Figure 7:
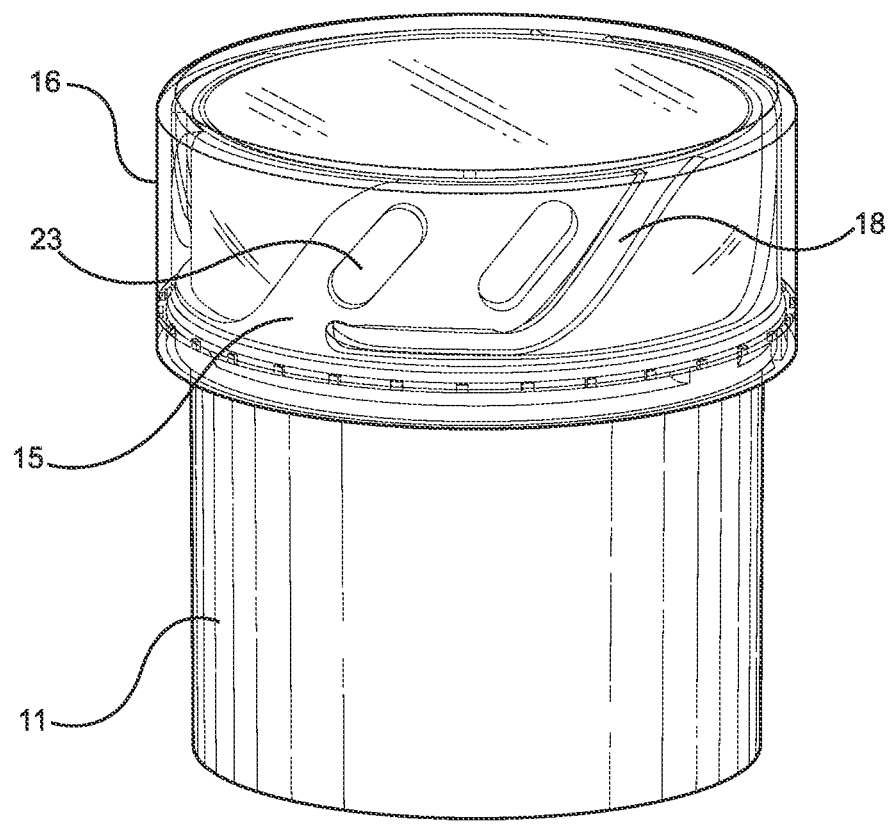
FIG. 7 shows a perspective view of an embodiment of the coupling seal for a container with the containment apparatus engaged with the container.

Referring now to FIG. 7, there is shown a perspective view of an embodiment of the coupling seal for a container with the containment apparatus engaged with the container. In the illustrated embodiment, the plurality of protrusions 15 defines a plurality of apertures 23. The apertures 23 are configured to catch a corresponding portion of the plurality of arises 18, providing additional security of the containment apparatus 16 to the container 11.

Figure 8:
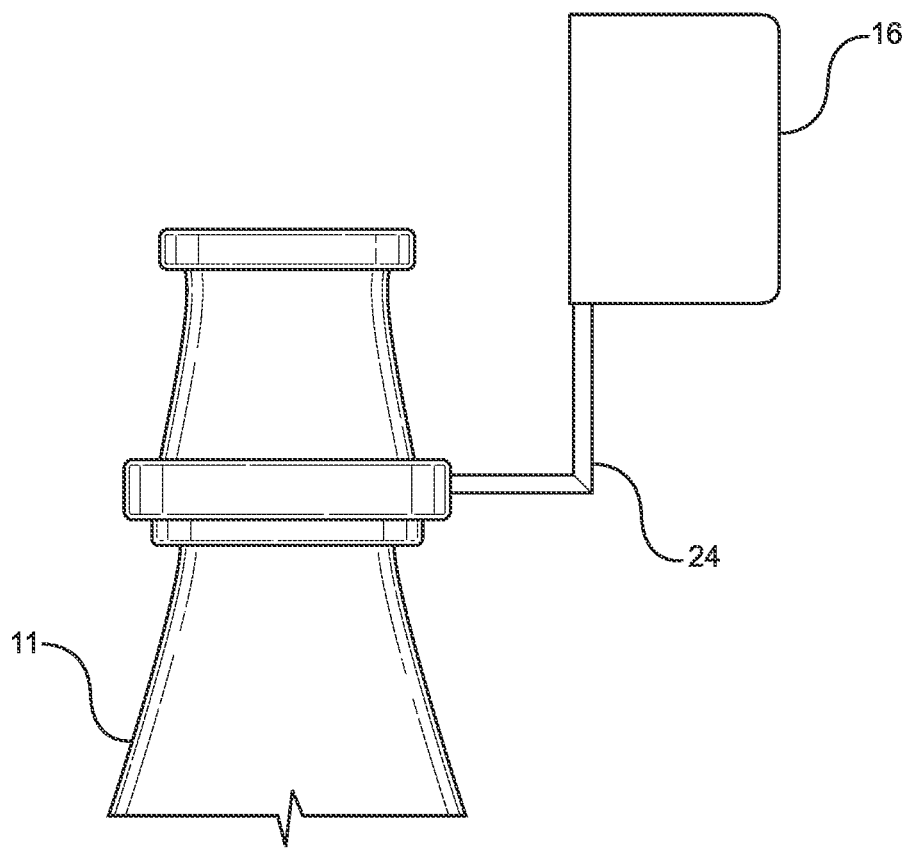
FIG. 8 shows a perspective view of an embodiment of the coupling seal for a container with the containment apparatus disengaged from the container.

Referring now to FIG. 8, there is shown a perspective view of an embodiment of the coupling seal for a container with the containment apparatus disengaged from the container. In the illustrated embodiment, the containment apparatus 16 comprises a connector 24. The connector 24 is configured to retain the containment apparatus 16 in connection with the container 11 when the containment apparatus 16 is rotated and separated from the break-away seal from the container 11.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coupling seal, comprising:
a container with an interior reservoir;
wherein the interior reservoir is accessible via a rim about an aperture disposed on the container;
wherein the rim comprises a plurality of protrusions about a circumference of the rim;
a containment apparatus mating about the rim of the container;
wherein the containment apparatus includes a surface with a peripheral flange protruding therefrom;
a plurality of arises disposed within the peripheral flange, the plurality of arises mate with the plurality of protrusions about the rim of the container;
wherein rotation of the containment apparatus causes coupling of the containment apparatus to the container, securing a material within the interior reservoir of the container;
wherein the plurality of protrusions about the rim are engaged with the plurality of arises within the containment apparatus, causing the container to seal and fortifying the rim of the container; and
wherein the plurality of arises are disposed on the peripheral flange, the plurality of arises are substantially rigid structures which comprises one or more intrusions or extrusions defined thereby, the containment apparatus is rotated on to and off of the rim of the container, and the plurality of arises glide along the plurality of protrusions efficiently and free of any stopping mechanisms.

2. The coupling seal of claim 1, wherein the plurality of protrusions are formed about the rim of the container such that rotational coupling of the plurality of protrusions to the plurality of arises occurs within the containment apparatus.

3. The coupling seal of claim 1, whereby dovetailing the containment apparatus arises with the plurality of protrusions of the rim maintains the arises secured between the vertical rim of the container and an edge of the protrusion thereof, keeping the peripheral flange of the containment apparatus from flexing outward as pressure is applied to the inside of the containment apparatus.

4. The coupling seal of claim 1, wherein the containment apparatus comprises a means for sealing the rim of the container selected from the group consisting of an O-ring fashioned seal, an applied seal material, a gasket, or any combination thereof.

5. The coupling seal of claim 1, wherein the plurality of arises comprises a plurality of engineered surfaces, such that when the containment apparatus is rotated on to and off of the rim of the container, the plurality of arises glide between the plurality of protrusions free from a plurality of stopping mechanisms.

6. The coupling seal of claim 5, wherein rotation of the containment apparatus is minimized, such that it is prescribed for ease of removal and sealing of a plurality of container contents.

7. The coupling seal of claim 1, wherein the plurality of protrusions comprises a nodule about an edge of each of the plurality of protrusions, whereby rotation of the containment apparatus causes the plurality of arises within the containment apparatus to engage the nodule, the nodule comprising a plurality of mating recesses, wherein engagement of the plurality of arises with the plurality of mating recesses causes the containment apparatus to be compressed onto the rim of the container.

8. The coupling seal of claim 7, wherein the plurality of arises comprises the nodule about the edge, whereby rotation of the containment apparatus causes the plurality of protrusions disposed on the rim to engage the nodule, the nodule comprising the plurality of mating recesses, wherein engagement of the plurality of protrusions with the plurality of mating recesses causes the containment apparatus to be compressed onto the rim of the container.

9. The coupling seal of claim 1, further comprising a break-away seal about the rim of the container with a plurality of mating catches within the flange of the container apparatus and the rim of the container, whereby minimal rotation of the containment apparatus causes the plurality of mating catches to catch upon each other, breaking away the break-away seal and allowing removal of the containment apparatus.

10. The coupling seal of claim 1, wherein elongation of the plurality of arises defines a plurality of additional recesses, allowing the containment apparatus to be secured to and seal the containment apparatus to the rim of the container, wherein the plurality of additional recesses allows the containment apparatus to rotate to the second recess and be secured to the rim with less resistance than the first recess, and wherein a plurality of rim apertures about the rim correspond with a second plurality of apertures of the containment device, allowing a dispense of the material within the container with minimal rotation of the containment apparatus and eliminating removal of the containment apparatus for each use of the containment apparatus.

11. A coupling seal, comprising:
a container with an interior reservoir;
wherein the interior reservoir is accessible via a rim about an aperture;
wherein the rim having a set of protrusions about the circumference of the rim;
wherein the set of protrusions having a curvature;
wherein a lower edge of each of the set of protrusions arises from a surface of the rim;
a containment apparatus having a peripheral flange with a plurality of arises within;
wherein the lower edge of the set of protrusions having a surface to contain and couple with the plurality of arises within the containment apparatus;
wherein a surface of each arise of the plurality of arises mates with the set of protrusions about the rim of the container such that the surface of the set of protrusions and the surface of each arise interlock;
wherein the plurality of arises are molded within the peripheral flange of the containment apparatus and couple to the set of protrusions about the rim of the container, such that the containment apparatus, in a minimal rotation, is interlocked to the rim via a set of corresponding surfaces selected from the group consisting of at least a plurality of angular surfaces, a plurality of curved surfaces, a plurality of slotted surfaces, or any combination thereof; and
wherein the set of protrusions are angled upward and inward at an end of each of the set of protrusions and each of the corresponding plurality of arises of the containment apparatus is angled in an opposite direction, such as to dovetail each of the plurality of arises to each of the set of protrusions to which it corresponds, coupling the containment apparatus to the rim of the container, and sealing a plurality of contents that pressurize the interior of the container.

12. The coupling seal of claim 11, wherein dovetailing the containment apparatus with the set of protrusions of the rim keeps the peripheral flange of the containment apparatus between the protrusion thereof and the sidewall of the rim, keeping the containment apparatus from flexing outward as pressure is applied inside of the containment apparatus.

13. The coupling seal of claim 11, further comprising a break-away seal about the rim of the container with a plurality of mating catches within the flange of the container apparatus and the rim of the container, whereby minimal rotation of the containment apparatus causes the plurality of mating catches to catch upon each other, breaking apart the break-away seal and allowing removal of the containment apparatus.

14. The coupling seal of claim 13, wherein the containment apparatus is rotated and separated from the break-away seal from the container, such that the containment apparatus remains affixed to the container via a connector.

15. The coupling seal of claim 11, wherein the set of protrusions of the rim are such that when the plurality of arises of the containment apparatus are rotated, the plurality of arises pass by the set of protrusions and enter a plurality of passages between the set of protrusions.

16. The coupling seal of claim 11, wherein the set of protrusions each comprise a nodule protruding therefrom, whereby the plurality of arises of the containment apparatus rotate over and sit within the nodules, increasing the pressure applied to the inner surface of the containment device and further sealing the container.

17. The coupling seal of claim 16, wherein the plurality of arises within the containment apparatus are elongated and configured to glide into a plurality of passages between the set of protrusions of the rim, whereby a plurality of corresponding recesses mate with the nodule of the set of protrusions, whereby partially rotating the containment apparatus causes the nodule to be moved to a second recess, the second recess is positioned to allow a release of pressure from the container, the containment apparatus is secured to the rim of the container via a dovetail of the plurality of arises to the set of protrusions.

18. The coupling seal of claim 17, wherein the elongation of the plurality of arises defines a plurality of additional recesses, allowing the containment apparatus to be secured to and seal the containment apparatus to the rim of the container, wherein the plurality of additional recesses allows the containment apparatus to rotate to the second recess and be secured to the rim with less resistance than the first recess, and wherein a plurality of rim apertures about the rim correspond with a second plurality of apertures of the containment device, allowing dispense of a material within the container with minimal rotation of the containment apparatus and eliminating removal of the containment apparatus for each use of the containment apparatus.

19. The coupling seal of claim 18, wherein within the container with the containment apparatus affixed, a scupper allows dispense of a material selected from the group consisting of a plurality of pills, a plurality of granular material, or any combination thereof.

* * * * *